US006203254B1

(12) United States Patent
Nashiki et al.

(10) Patent No.: US 6,203,254 B1
(45) Date of Patent: Mar. 20, 2001

(54) PARALLEL MECHANISM MACHINING DEVICE

(75) Inventors: Masayuki Nashiki; Tetsuya Matsushita; Masao Nakagawa; Shigeharu Watanabe, all of Aichi (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 09/408,676

(22) Filed: Sep. 30, 1999

(30) Foreign Application Priority Data

Oct. 19, 1998 (JP) .................................................. 10-297045

(51) Int. Cl.[7] .................................. B23C 9/00; B23C 1/12
(52) U.S. Cl. ........................ 409/201; 409/211; 409/216; 409/235; 901/41
(58) Field of Search ..................................... 409/235, 231, 409/204, 211, 216, 201; 414/917; 74/490.06; 901/41

(56) References Cited

U.S. PATENT DOCUMENTS

| 3,998,127 | * | 12/1976 | Romeu ................................. 409/235 |
| 4,705,438 | * | 11/1987 | Zimmerman et al. ................ 409/132 |
| 4,988,244 | * | 1/1991 | Sheldon et al. ...................... 409/132 |
| 5,259,710 | * | 11/1993 | Charles ................................ 409/235 |
| 5,333,514 | * | 8/1994 | Toyama et al. .................... 74/490.06 |
| 5,388,935 | * | 2/1995 | Sheldon ............................... 409/201 |
| 5,401,128 | * | 3/1995 | Lindem et al. ...................... 409/235 |
| 5,556,242 | * | 9/1996 | Sheldon et al. ...................... 409/235 |
| 5,656,905 | * | 8/1997 | Tsai ....................................... 901/41 |
| 5,715,729 | * | 2/1998 | Toyama et al. ...................... 409/235 |
| 5,787,758 | * | 8/1998 | Sheldon ............................... 409/235 |
| 5,906,461 | * | 5/1999 | Lunz et al. ........................... 409/201 |
| 5,919,014 | * | 7/1999 | Weck et al. .......................... 409/201 |

FOREIGN PATENT DOCUMENTS

| 1296-401 | * | 3/1987 | (SU) ..................................... 409/201 |
| 2179605 | * | 3/1987 | (GB) ..................................... 409/235 |
| 1731593-A1 | * | 5/1992 | (SU) ..................................... 409/235 |
| 9217313 | | 10/1992 | (WO) . |

OTHER PUBLICATIONS

Internet printout, Titled "Les robots a mouvements spatiaux/Spatial robots", internet address http://www–sop/inria.fr/saga/personnel/merlet/Archi/node2.html, Apr. 2000.*

* cited by examiner

Primary Examiner—William Briggs
Assistant Examiner—Erica Ergenbright
(74) Attorney, Agent, or Firm—Pearson & Pearson

(57) ABSTRACT

The present invention is designed to realize structure having high rigidity in any direction and to realize a parallel mechanism machining device having good chip removal property.

According to the present invention, forked adjustable joints 28 are provided at two positions near the tip end of a movable body 20 and near the rear end thereof, respectively, two first links 36 and two second links 37 are attached to the movable body 20 and the tip ends of these links are extended in X and Y axis directions and coupled to a machine-side fixed platform through adjustable joints, respectively. A link 5 extending in Z axis direction is attached to the rear end of the movable body 20 and a restriction link 6 is attached to the back of the forked adjustable joint 28 near the tip end.

7 Claims, 8 Drawing Sheets

PARALLEL MECHANISM MACHINING DEVICE

BACKGROUND OF THE INVENTION

1. Field of the Invention

The present invention relates to a machining device utilizing a parallel mechanism for supporting a tool using a plurality of link mechanisms.

2. Description of the Related Art

Machine tools to which a parallel mechanism is applied have been developed. Most of the machining devices adopt a structure referred to as "Stewart platform" structure.

The outside view of a parallel mechanism machining device of ordinary Stewart platform structure is shown in FIG. 7 and the typical view thereof is shown in FIG. 8. In FIG. 8, each of adjustable joints 41 (41a to 41f) supporting six links 40 (40a to 40f) at a movable body 20 side has a constitution shown in, for example, FIG. 9 that the rotary shaft thereof is supported by an anti-friction bearing.

In addition, each of adjustable joints 42 (42a to 42f) supporting six links at a fixed platform 34 side has a constitution shown in, for example, FIG. 10 that the rotary shaft thereof is supported by an anti-friction bearing. The links, which are, for example, ball springs, are extensible by rotating nuts by a servo motor. In FIG. 8, reference symbol 19 denotes a table and 21 denotes a tool.

The above-stated Stewart platform structure is characterized in that the structure is simple and has high rigidity of the structure in Z-axis direction (tool rotation axis direction in FIG. 8). Since the movable body 20 serving as a platform is protruded from the fixed base 34, its rigidity in X and Y axis directions is low. Since the table 19 is fixed to the lower surface, the structure has disadvantageously bad chip removal property.

BRIEF SUMMARY OF THE INVENTION

The present invention has been made under the circumstances. The object of the invention according to a first embodiment is, therefore, to realize a parallel mechanism machining device of structure having high rigidity in any direction and the object of the invention according to a second embodiment is to realize a parallel mechanism machining device having good chip removal property.

To obtain the above objects, the invention according to the first embodiment is constituted as a parallel mechanism machining device supporting a movable body holding one of a main shaft for rotating a tool and a work so that the movable body can be moved relative to the other one of the main shaft and the work by a plurality of link mechanisms connected to the movable body by adjustable joints, respectively, the device comprising two first links each having one end connected near a point on the movable body; two second links each having one end connected near a point other than the point on the movable body; a third link extending almost parallel to a straight line passing a connection between the first links and the second links; and a restriction link restricting degree of freedom of movement of the movable body, wherein the other ends of the links are supported by a surrounding fixed platform through adjustable joints, respectively, and the two links of each of the first and second links have about 90 degrees with each other to allow a state in which the respective links extend in a direction almost orthogonal to the third link.

The invention according to a third embodiment is constituted as the parallel mechanism machining device according to the first embodiment, and further including that the two links of at least one of the first links and the second links are connected to the movable body by forked adjustable joints, respectively.

Each of the forked adjustable joints may consist of a circular arc guide rotatable on an attachment surface on which the joint is attached to the movable body, a ring body guided by the circular ark guide and rotatable on a surface orthogonal to the attachment surface, a bearing provided at a center of the ring body and rotatable on a surface orthogonal to both of the attachment surface and the surface orthogonal to the attachment surface, two links connected to the forked adjustable joint through the bearing.

According to a further feature, the invention according to the disclosed embodiments may include a circular table rotating while fixing the work, whereby a direction of the main shaft of the movable body can be changed from a direction of a rotation center line of the circular table to a direction perpendicular to the rotation center line.

According to the second embodiment of the invention, the circular table is provided with an inclination mechanism, whereby the circular table can be both placed horizontally and inclined by not less than 20 degrees with respect to a horizon.

BRIEF DESCRIPTION OF THE DRAWINGS

FIGS. 4A and 4B show another concrete example of a forked, adjustable joint wherein FIG. 4A is a front view and FIG. 4B is a side view;

DESCRIPTION OF THE PREFERRED EMBODIMENTS

Figure 1:
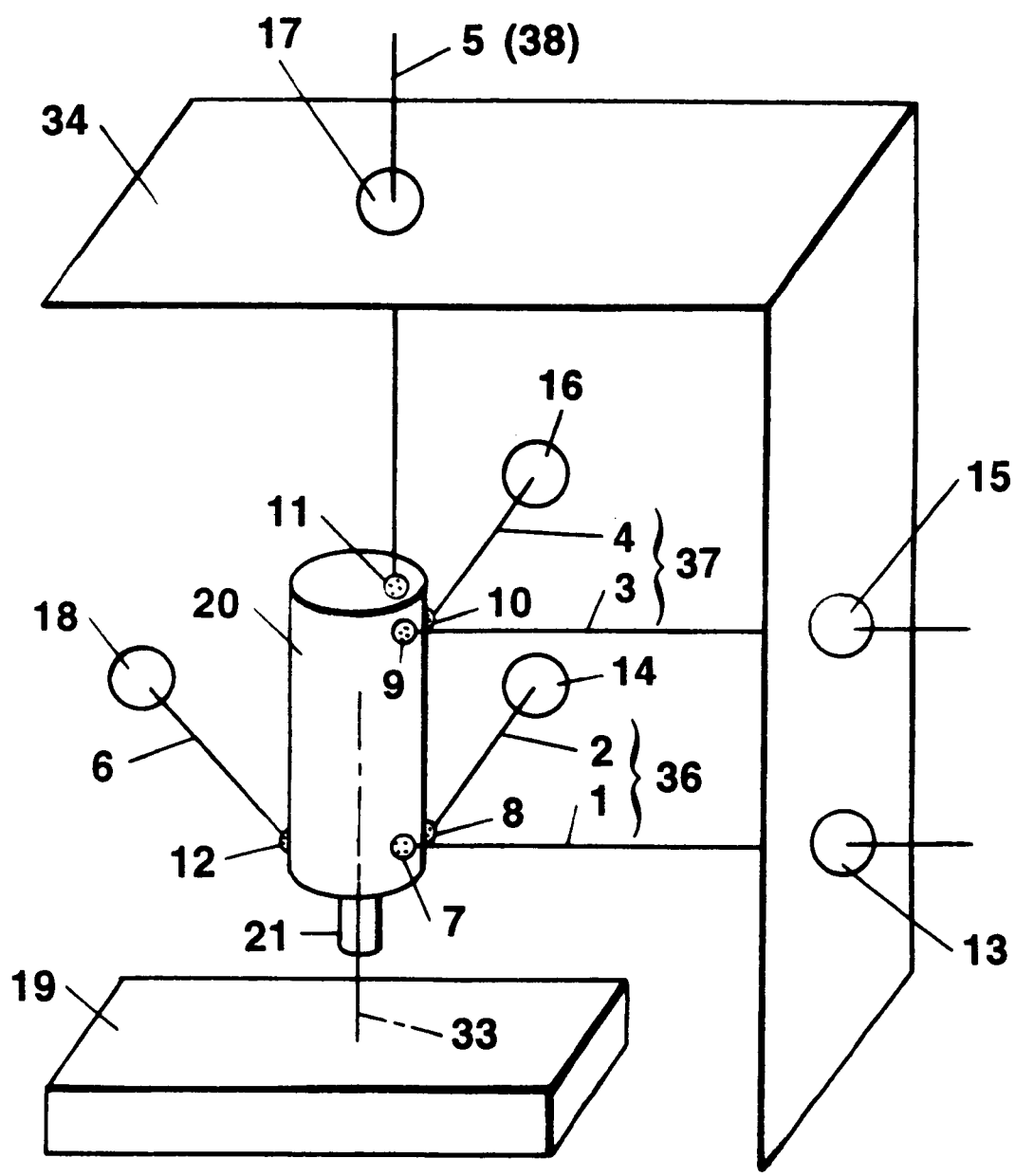
FIG. 1 is a typical view showing a parallel mechanism machining device in the first embodiment according to the present invention and showing a state in which a movable body is positioned at the center of its moving range.

Now, the embodiments of the present invention will be described in detail based on the accompanying drawings. FIG. 1 is a typical view of a parallel mechanism machining device according to the present invention, showing an initial state in which a movable body is positioned at the center of a movable range.

A tool 21 is attached to the lower tip end portion of the movable body 20. The movable body 20 has a main shaft for rotating the tool 21 internally and is supported by a fixed platform 34 provided at a machine side by links 1 to 6. The one ends of the links 1 to 6 are supported by adjustable joints 7 to 12 and the other ends thereof are supported by adjustable joints 13 to 18 attached to the fixed platform 34 side, respectively. The three links 1, 2 and 6 among those links are attached near the tip end of the movable body 20, whereas the remaining three links 3, 4 and 5 are attached near the rear end thereof.

The two links 1 and 2, among the three links 1, 2 and 6 attached near the tip end side, are connected to positions in the vicinity of the movable body 20 and provided in X and Y directions, respectively, so as to have about 90 degrees with each other in an initial state. The links 1 and 2 serve as the first links 36. The remaining link 6 is a restriction link provided at an opposite side of the movable body 20 to the first links 36. Mainly for the purpose of restricting the degree of freedom of the rotation of the movable body about the Z axis.

Also, the two links 3 and 4, among the three links 3, 4 and 5 attached near the rear end side, are connected to positions in the vicinity of the movable body 20 and provided in X and Y directions, respectively, so as to have about 90 degrees with each other in an initial state. The links 3 and 4 form the second links 37 as a whole. The link 5 is the third link 38 provided in a direction almost parallel to a tool rotation axis 33 which is the direction of the main axis of the tool 21 provided at the tip end of the movable body 20.

The movable body 20 can be stabilized by providing the first links 36 and the second links 37 to be away from each other as further as possible. As shown in FIG. 1, if the links are provided to be away from each other in the same direction almost parallel to the tool rotation axis 33, the moving accuracy of the movable body 20 enhances and the position of the tool 21 can be stabilized.

Figure 8:
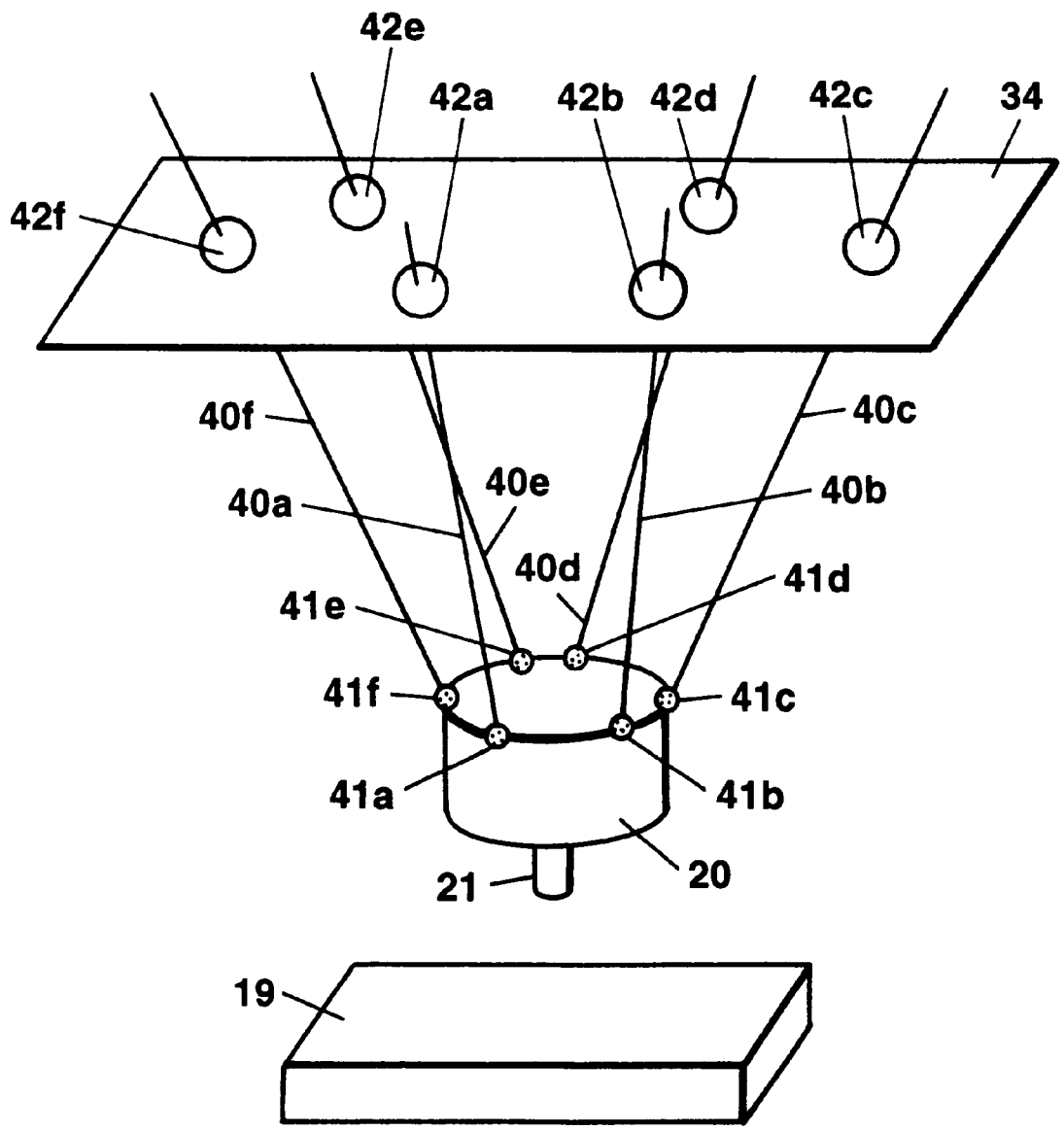
FIG. 8 is a typical view of FIG. 7.
Figure 9:
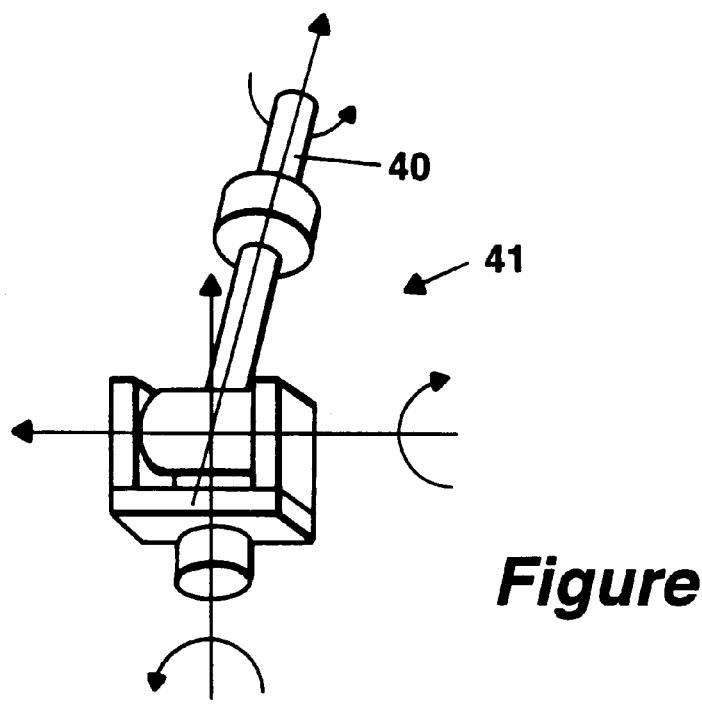
FIG. 9 is a perspective view showing a concrete example of a movable body side adjustable joint shown in FIG. 7.
Figure 10:
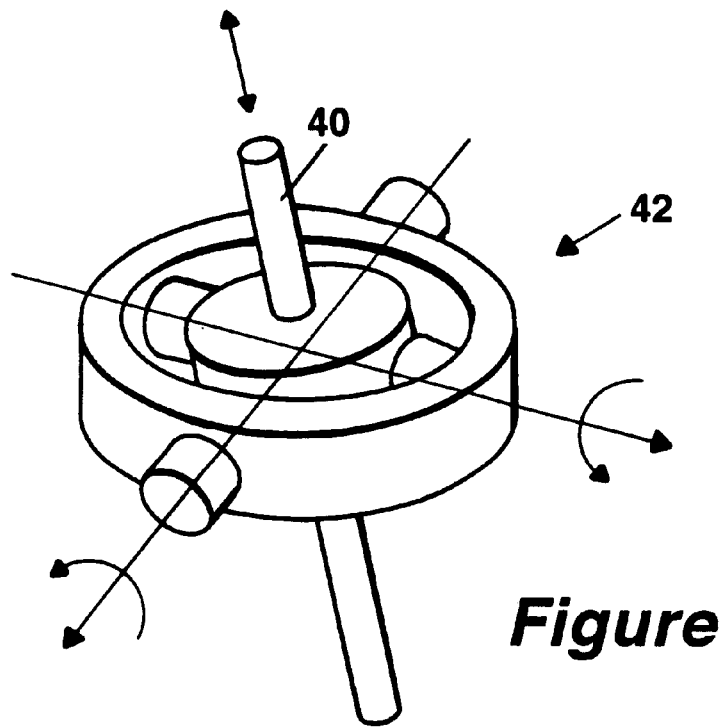
FIG. 10 is a perspective view showing a concrete example of a fixed side adjustable joint.

By doing so, the external force applied to the movable body 20 in each direction is also applied to the axial directions of the links. As a result, compared with the Stewart platform structure shown in FIG. 8 in which the force applied to the axial directions of the links is amplified, the structure of this embodiment can exhibit high rigidity. In addition, the external force in Z axis direction can be applied to the axial direction of the third link or link 5, so that the same rigidity as that in X and Y axis directions can be obtained.

The above state is set as a state in which the movable body 20 is positioned at the center of a movable range (initial state), thereby making it possible to make the reduction of rigidity to lower degree even if the movable body 20 moves from the central position.

Figure 2:
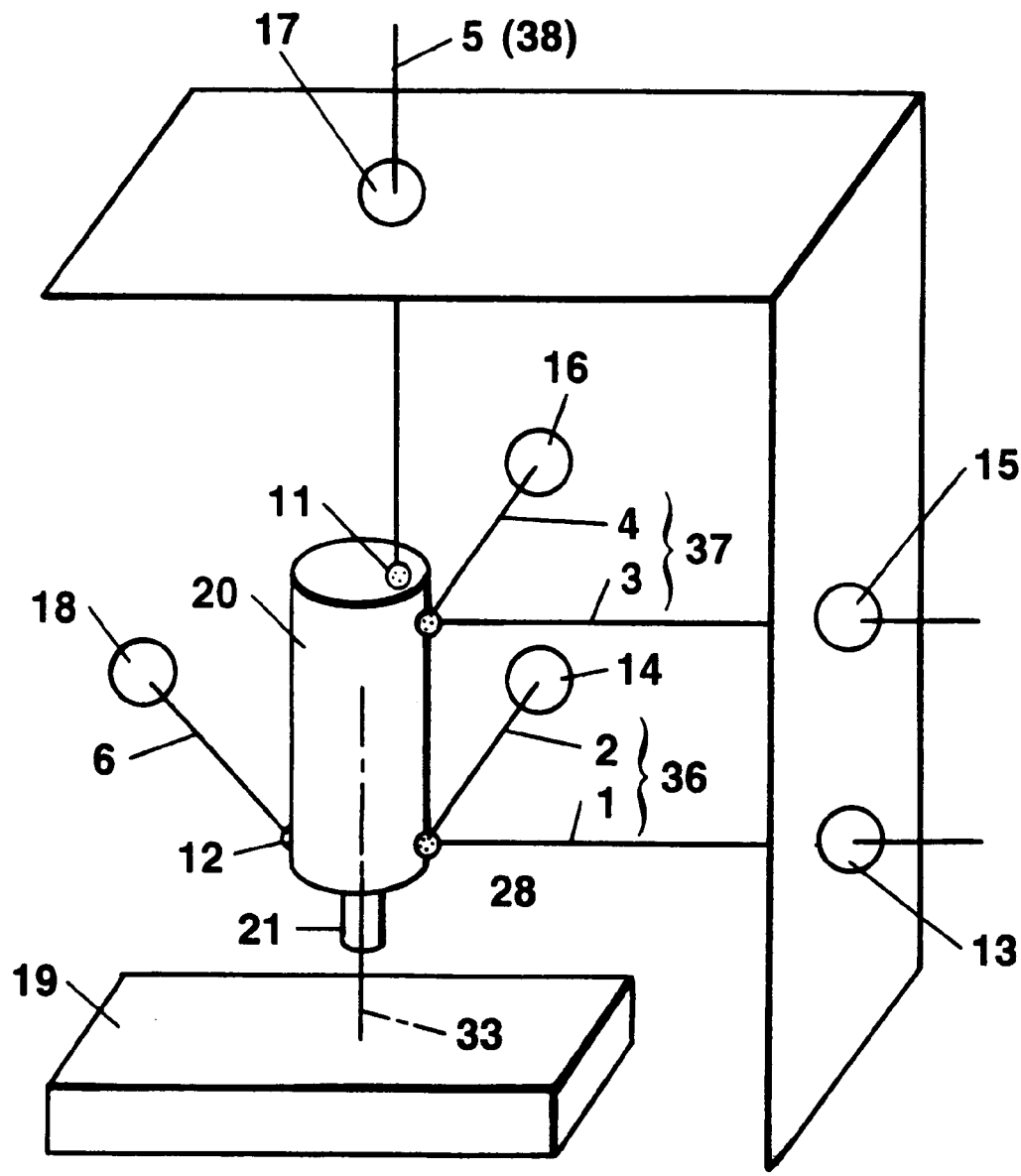
FIG. 2 is a typical view showing a parallel mechanism machining device in the second embodiment according to the present invention.
Figure 3:
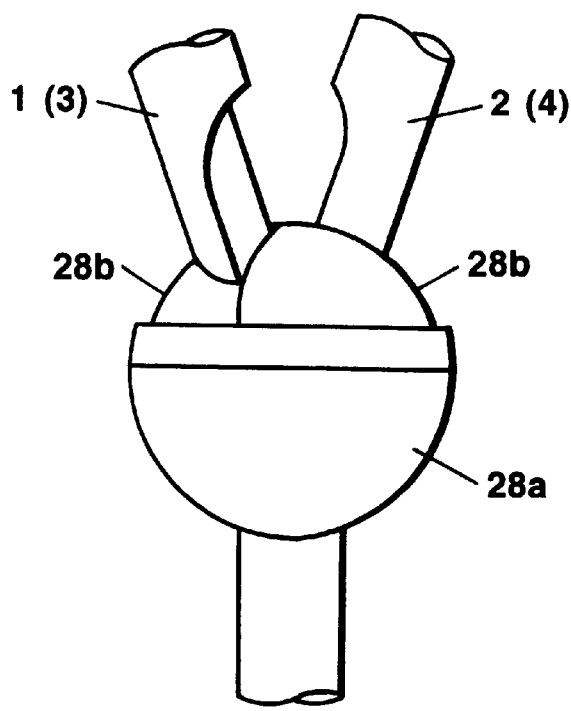
FIG. 3 is a side view showing a concrete example of a forked adjustable joint shown in FIG. 2.
Figure 4:
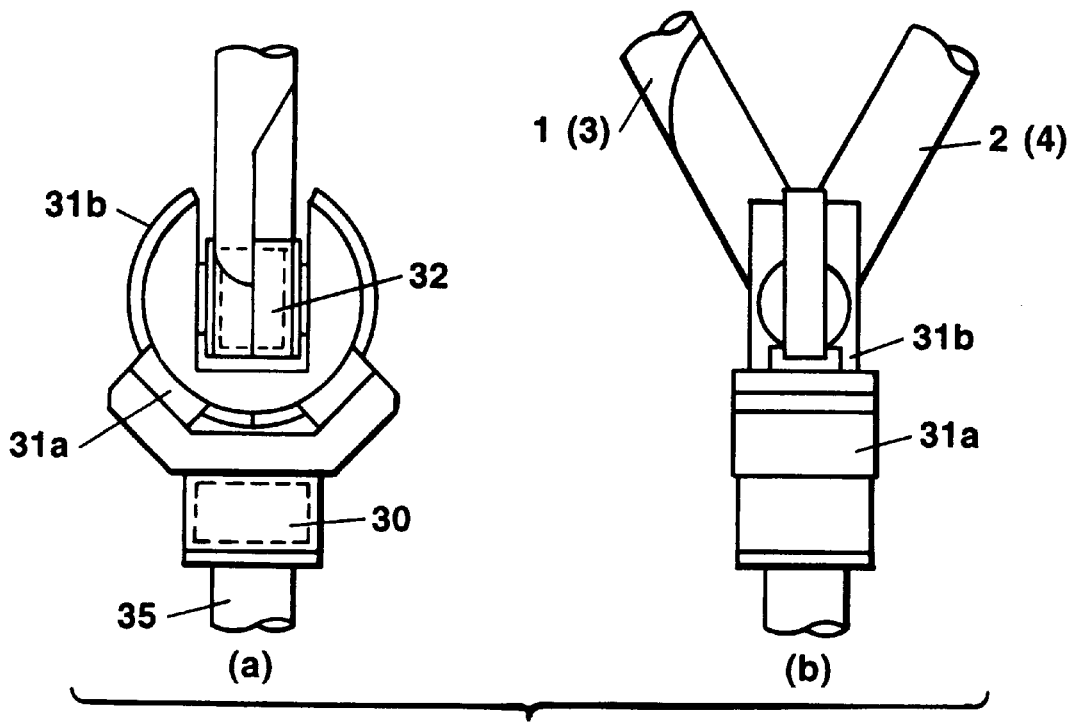

FIGS. 2 to 4 show the second embodiments according to the present invention. FIG. 2 shows the constitution of a parallel mechanism machining device in which the adjustable joints (7, 8 and 9, 10) of the two sets of links (1,2 and 3, 4) of the first links 36 and the second links 37 shown in FIG. 1 are integrated into forked adjustable joints 28, respectively. FIGS. 3 and 4 show the concrete examples of the forked adjustable joints.

FIG. 3 illustrates a case where a spherical sliding bearing is employed. In FIG. 3, two hemispheres 28b each having a diameter equal to the inner diameter of a hemispheric bearing 28a are incorporated into the bearing 28a and connected to the links 1 (3) and 2 (4), respectively.

FIG. 4 illustrates a case where an anti-friction bearing is employed. Reference symbol 30 denotes the first bearing rotating around a fixed shaft 35 and on the fixed shaft 35. Reference symbol 31a denotes a circular arc guide installed on the first bearing 30 through the first bearing 30. Reference symbol 31b denotes a ring body guided by the circular arc guide 31a and rotating in the direction orthogonal to the fixed shaft 35. The rotation center of the ring body 31b is positioned on the axis line of the fixed shaft 35. At the rotation center of the ring body 31b, there is provided the second bearing 32 coupled to the ring body 31b and having a rotation axis orthogonal to the rotation axis of the first bearing 30 and to that of the ring body 31b. The two links 1 (3) and 2 (4) are provided to be freely opened through the second bearing 32.

By using the forked adjustable joints as stated above, the overall constitution of the machining device can be made simple, the compact movable body can be provided and the weight can be reduced.

Figure 5:
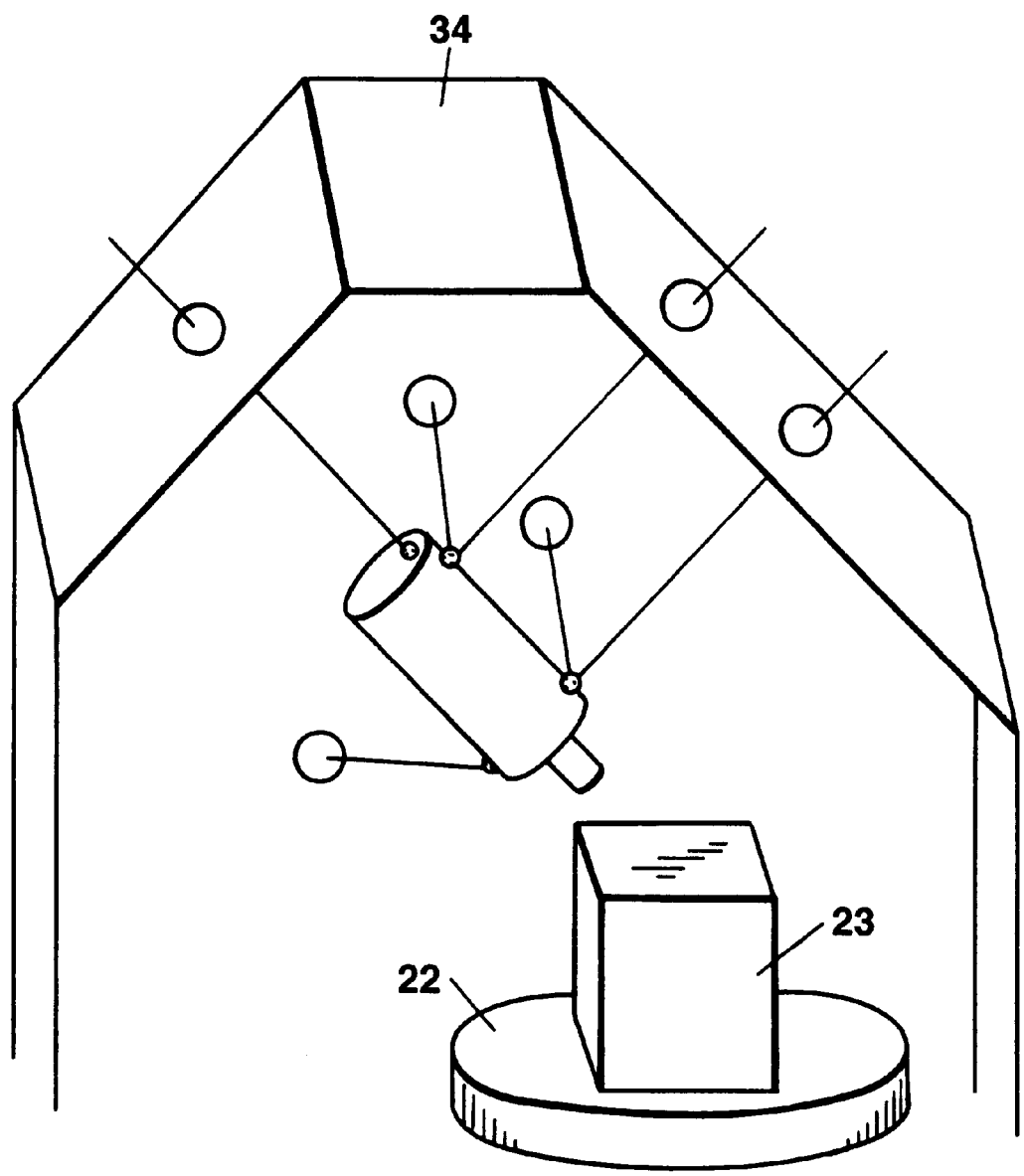
FIG. 5 is a typical view showing a parallel mechanism machining device in the third embodiment according to the present invention.

FIG. 5 shows the third embodiment according to the present invention. In FIG. 5, a rotatable circular table 22 is used as a table and the angle of the movable body 20 in the initial state is inclined by 45 degrees with respect to the vertical direction. Since the circular table 22 is provided with an indexing mechanism using, for example, a hydraulic clamp, the circular table 22 can function as a positioning mechanism having high rigidity compared with positioning using only gears.

If the movable body in the initial state is inclined as stated above, it is possible to machine the work 23 from the upper surface toward the side surface and to realize complete five-surface machining in accordance with the rotation of the circular table 2.

Figure 6:
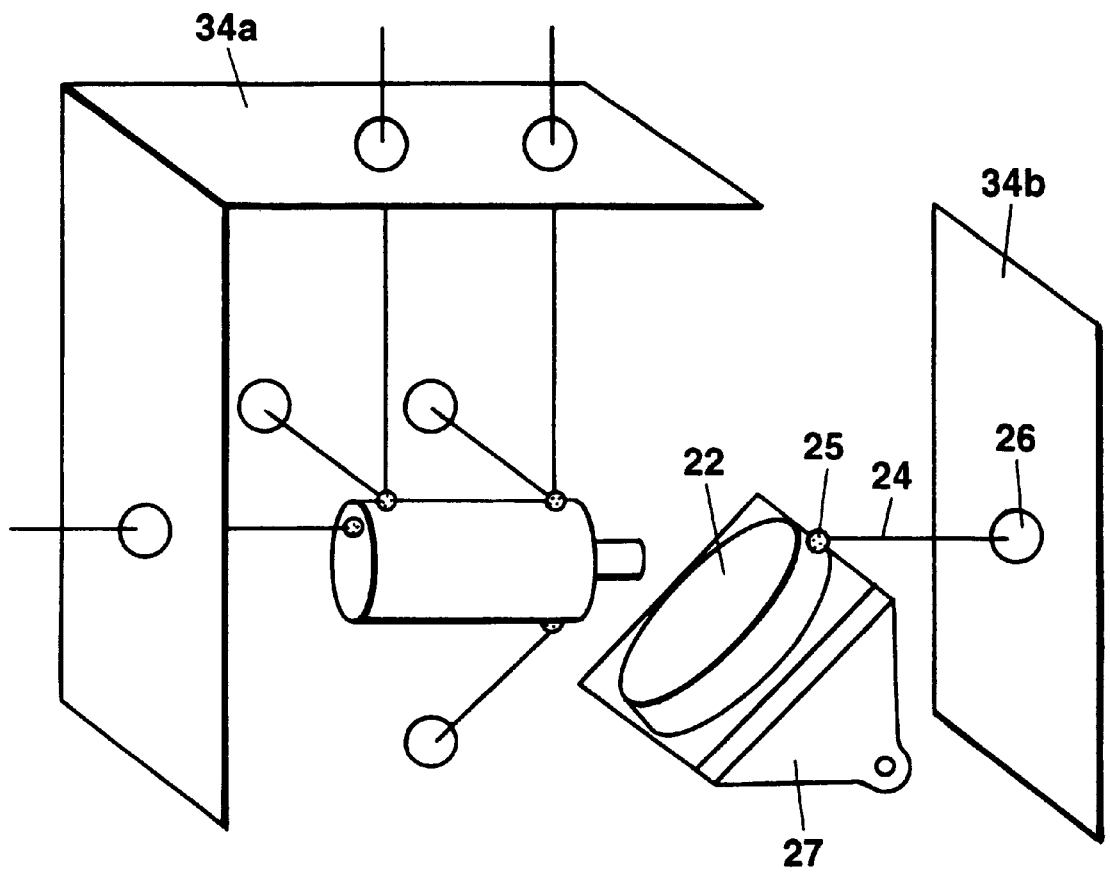
FIG. 6 is a typical view showing a parallel mechanism machining device in the fourth embodiment according to the present invention.
Figure 7:
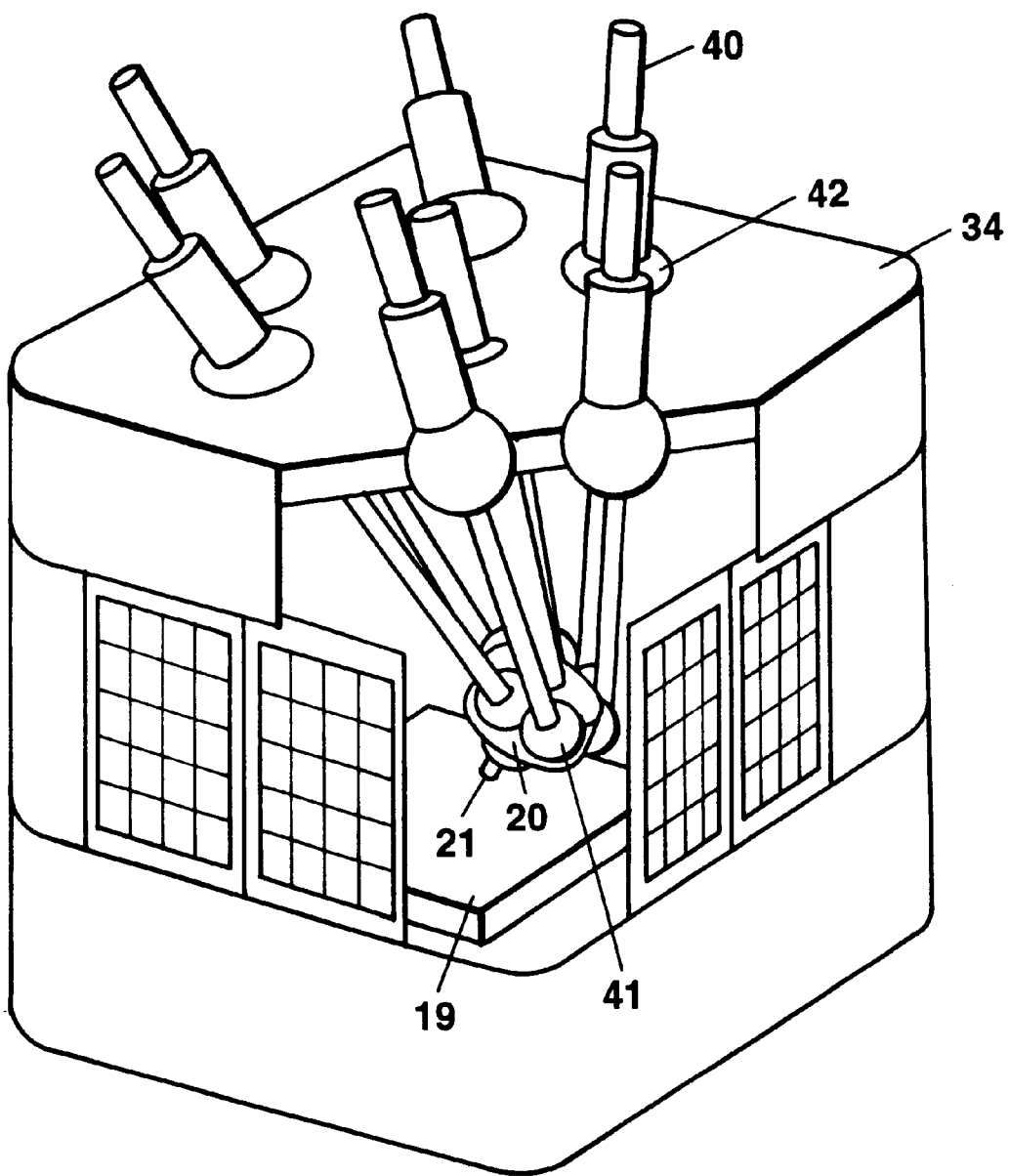
FIG. 7 is an outside view of a conventional parallel mechanism machining device.

FIG. 6 shows the fourth embodiment according to the present invention. In FIG. 6, a circular table 22 is mounted on an inclination auxiliary platform 27 which can be inclined by up to 45 degrees with respect to the vertical direction and the angle of the movable body 20 in the initial state is inclined by 90 degrees from the vertical direction. Reference symbol 24 denotes a link controlling the inclination of the inclination auxiliary platform 27. The link 24 has one end supported by the inclination auxiliary platform 27 through an adjustable joint 25 and the other end supported by a fixed platform 34b through an adjustable joint 26.

By providing the inclination auxiliary platform 27 and hydraulically clamping the body in a state in which the platform 27 is inclined by, for example, 45 degrees, the platform 27 functions as a positioning mechanism having high rigidity as in the case of the circular table 22 shown in FIG. 5. It is, thus, possible to realize complete five-surface machining and chips can be well removed due to the inclined platform 27. Furthermore, if the inclination auxiliary platform 27 is rotated to make the table surface 22a horizontal, then a work can be easily attached and detached. Since the movable body is inclined by 90 degrees, it is possible to provide a vacant space right above the circular table 22, thereby facilitating loading/unloading a work using a crane.

In the above embodiments, the third (single) link provided in Z direction is connected to the movable body in the vicinity of the connection of the second links to the movable body and the restriction link is positioned opposite to the first links. However, the third link may not be positioned in the vicinity of the second links. The restriction link may not be the opposite side to the first links as long as it is near the tool. It is also possible to appropriately change or modify the shape and constitution. of the parallel mechanism machining device to the extent that they do not deviate from the scope and concept of the present invention.

As stated so far, according to the invention recited in as shown in FIGS. 1 and 2, it is possible to realize a structure having high rigidity in any direction.

The forked adjustable joints 28 can be made simple and lightweight so that the entire movable body can be made small in size and the weight thereof can be reduced.

According to the invention recited in claim 4, it is possible to realize complete five-surface machining in addition to the advantages of the invention as shown in FIGS. 1 and 2, and, it is possible to provide a space above the circular table, thereby facilitating loading and unloading a tool using, for example, a crane and provides good chip removal property.

What is claimed is:

1. A parallel mechanism machining device supporting a movable body holding one of a main shaft for rotating a tool or a work so that the movable body can be moved relative to the other one of the main shaft or the work by a plurality of links, each link having an end connected to the movable body by adjustable joints and having another end connected to a fixed platform by adjustable joints, said device comprising:

two first links each having one end connected substantially at a first point on the movable body;

two second links each having one end connected substantial at a second point other than said first point on the movable body;

a third link having an end connected to the movable body and extending substantially parallel to a straight line between said first point and said second point; and a restriction link having one end connected to the movable body and restricting a degree of freedom of movement of the movable body, wherein the two links of each of said first and second links extend at substantially a 90 degree angle with respect to each other to define a state in which the respective first and second links extend in a direction substantially orthogonal to the third link.

2. The parallel mechanism machining device according to claim 1, wherein the two links of at least one of the first links and the second links are connected to the movable body by forked adjustable joints.

3. The parallel mechanism machining device according to claim 2, wherein each of the forked adjustable joints is connected to the movable body at an attachment surface, and wherein each of the forked adjustable joints consists of a circular arc guide that is rotatable about an axis, a ring body guided by the circular arc guide and rotatable about an axis orthogonal to said attachment surface, a bearing provided at a center of the ring body and rotatable about an axis orthogonal to both said attachment surface and said axis orthogonal to said attachment surface, and two links connected to each said forked adjustable joint through said bearing.

4. The parallel mechanism machining device according to claim 3, wherein the device comprises a rotating circular table that linearly fixes the work, and a longitudinal rotational axis of the main shaft of the movable body can be moved from a position where the main shaft axis is parallel to a rotation center line of said circular table to a position where the main shaft axis is perpendicular to the table rotation center line.

5. The parallel mechanism machining device according to claim 2, wherein the device comprises a rotating circular table that linearly fixes the work, and a longitudinal rotational axis of the main shaft of the movable body can be moved from a position where the main shaft axis is parallel to a rotation center line of said circular table to a position where the main shaft axis is perpendicular to the table rotation center line.

6. The parallel mechanism machining device according to claim 1, wherein the device comprises a rotating circular table that linearly fixes the work, and a longitudinal rotational axis of the main shaft of the movable body can be moved from a position where the main shaft axis is parallel to a rotation center line of said circular table to a position where the main shaft axis is perpendicular to the table rotation-center line.

7. The parallel mechanism machining device according to claim 6, wherein the circular table is provided with an inclination mechanism, whereby the circular table can be both placed horizontally and inclined by at least than 20 degrees with respect to a horizon.

* * * * *